UNITED STATES PATENT OFFICE.

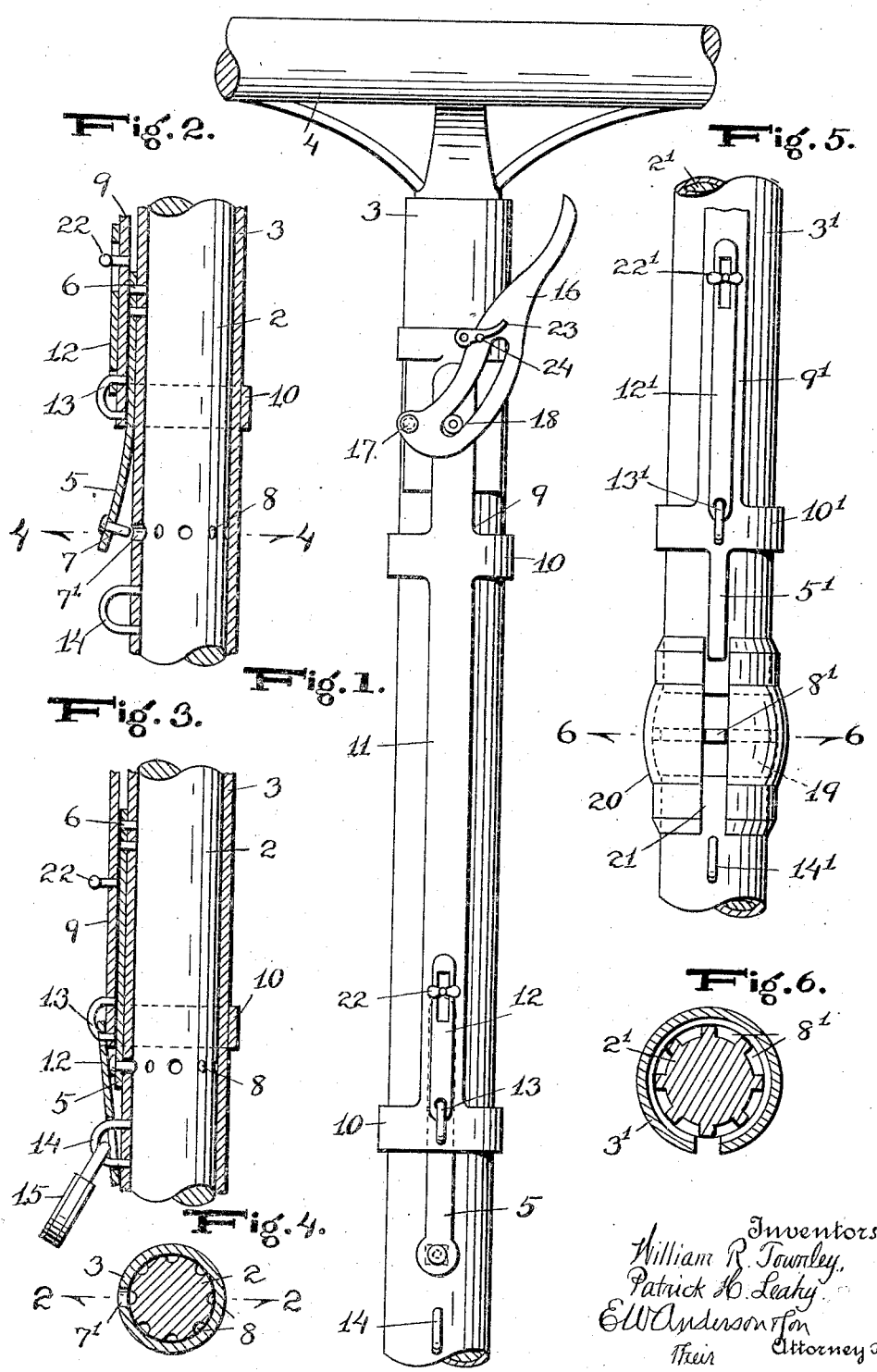

WILLIAM R. TOWNLEY AND PATRICK H. LEAHY, OF CANANDAIGUA, NEW YORK; DORA A. LEAHY ADMINISTRATRIX OF SAID PATRICK H. LEAHY, DECEASED.

AUTOMOBILE-STEERING-ROD LOCK.

1,362,451.  Specification of Letters Patent.  Patented Dec. 14, 1920.

Application filed August 2, 1917. Serial No. 184,099.

*To all whom it may concern:*

Be it known that we, WILLIAM R. TOWNLEY and PATRICK H. LEAHY, citizens of the United States, residents of Canandaigua, in the county of Ontario and State of New York, have made a certain new and useful Invention in Automobile-Steering-Rod Locks; and we declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of the invention as applied.

Fig. 2 is a section on the line 2—2, Fig. 4, with the lock released.

Fig. 3 is a similar view with the lock engaged.

Fig. 4 is a section on the line 4—4, Fig. 2.

Fig. 5 is a side view of a modification, showing the lock released.

Fig. 6 is a section on line 6—6, Fig. 5.

The invention has relation to means for locking the steering post of an automobile against rotation, said means adapted for use with the wheels of the machine in position for driving straightahead, or turned at any angle.

The invention consists in the novel construction and combination of parts as hereinafter set forth.

In the accompanying drawings illustrating the invention, the numeral 2 designates the steering post, and 3 is a non-rotary sleeve or column surrounding said post and wherein the post turns or is rotated by operation of the hand wheel 4.

5 is a downwardly projecting elastic tongue or clutch member carried by the steering column or tube, being riveted thereto at one end at 6, and having at its other end an inwardly projecting tooth 7, designed to pass through an opening 7' of said column into engagement with any one of a series of recesses or seats 8 of said post to secure the post and the column together and prevent rotation of the post. The clutch tongue is laterally yieldable and is normally sprung outwardly into position of release from the seats of the post.

9 is a sliding sleeve mounted upon the steering column and consisting usually of two annular members 10, and a connecting bar 11, said sleeve at one end engaging over the locking tongue 5 and pressing the same inwardly into position close to the steering column and post, the tooth 7 being thereby held in engagement with its seat in the post.

The sliding sleeve is provided at its lower end with a hasp 12 pivoted thereto at 13 and at its free end engaging over a staple 14 of the steering column, a padlock 15 engaging said staple and serving to hold the sleeve in downwardly moved position with the clutch members engaged, the steering post being then locked in position against rotation.

An operating lever 16 is pivoted at 17 to the steering column adjacent to and below the steering wheel 4, and is provided with a slot and pin connection 18 with the sliding sleeve, the slot having inclined or cam walls and upon actuation of the lever pressing the sleeve downwardly over the clutch tongue and said tongue inwardly into engagement with its seat in the steering post. Upon reverse movement of the lever the sleeve is brought upwardly from over said tongue, the latter then through inherent elasticity springing laterally or outwardly and releasing the tooth thereof from the seat of the steering post, said post being then free to be turned in steering.

The hasp 12 when thrown upwardly is held in raised position by a latch 22 engaging the slot thereof, the operating lever having a latch 23 engaging a pin 24 thereof and serving to hold the lever and the sliding sleeve in raised position.

A modification of the invention is shown in Figs. 5 and 6 of the drawings, wherein the locking tongue is made a rigid or integral part of the sleeve and slides therewith into engagement between two adjacent outwardly projecting members of an annular series of cogs or teeth corresponding to the series of seats in the form first described, the same reference characters being employed differentiated by the exponent 1. In this modified form the steering column is usually made of two sections spaced apart at 19 and connected by a sleeve 20, the latter having a longitudinal slot 21 wherein the locking tongue has movement.

The use of this invention will permit the machine to be moved in case of fire or other emergency in the direction in which the steering wheels are turned when the lock is effected, and insures against theft, inasmuch as the steering of the machine is made impossible, also preventing trailing.

We claim:—

1. In a lock for an automobile, a non-rotary steering column, a rotary steering post within said column and bearing an annular series of clutch members, a sliding sleeve upon said column and a clutch member coöperating with said sleeve and adapted upon movement of said sleeve in one direction to be engaged with certain of the first-named clutch members and upon movement in the opposite direction to be released therefrom, said sliding sleeve encircling the column adjacent to and bracing said clutch members when in engaged position.

2. In a lock for an automobile, a non-rotary steering column, a rotary steering post within said column and bearing an annular series of clutch members, a sliding element upon said column, and a clutch member coöperating with said element and adapted upon movement of the element in one direction to be engaged with certain of the first named clutch members and upon movement in the opposite direction to be released therefrom, and a locking device including a hasp pivoted to said element and a staple upon said column.

3. In an automobile lock, a non-rotary steering column, a rotary steering post within said column and bearing an annular series of clutch members, a sliding element upon said column, a clutch member coöperating with said element and adapted upon movement of the element in one direction to be engaged with certain of said members and upon movement in the opposite direction to be released therefrom, an operating lever for said element, a locking device for holding said sleeve in position as moved in one direction, and a latch for said lever to hold said element as moved in the opposite direction.

4. In an automobile lock, a non-rotary steering column, a rotary steering post within said column and bearing an annular series of clutch members, a sliding sleeve upon said column, and a laterally movable elastic clutch tongue mounted upon said column within said sleeve and adapted upon movement of said sleeve in one direction to be engaged with certain of said clutch members and upon movement in the opposite direction to be released therefrom.

In testimony whereof we affix our signatures, in presence of two witnesses.

WILLIAM R. TOWNLEY.
PATRICK H. LEAHY.

Witnesses:
JAMES H. TOZER,
M. FRANCES McINTYRE.